United States Patent Office.

GEORGE W. TALBOT, OF PROVIDENCE, RHODE ISLAND.

Letters Patent No. 99,496, dated February 1, 1870.

IMPROVEMENT IN DYES FOR COLORING WOOL.

The Schedule referred to in these Letters Patent and making part of the same.

*To all whom it may concern:*

Be it known that I, GEORGE W. TALBOT, of the city and county of Providence, in the State of Rhode Island, have made certain new and useful Improvements in Dyes for Coloring Wool; and I do hereby declare that the following specification is a full, clear, and exact description thereof.

The object of my invention is to produce dyes for coloring, which, from the combination of ingredients employed, shall be capable of giving to the fabric or yarn upon which it is used a richness and a strength of color hitherto unequaled, and consists in the combination of foreign dyes with the domestic extracts, as hereinafter described and claimed.

It is well understood that extracts made from domestic barks, woods, and plants, possess qualities of such a stringent nature as to render them incapable of being used alone in the coloring of any woollen fibre which is to be afterward manufactured into fabric or yarn.

The domestic extracts, however, are produced at a much less expense than the foreign dyes, so that the substitution of the former for the latter, even in part, must necessarily result in materially reducing the expense of coloring, so that the amount saved in a large manufacturing-establishment would, yearly, be equivalent to a considerable sum of money.

The chief difficulty experienced in the use of foreign dyes is the want of sufficient stringent qualities to render the colors permanent, and prevent their running into each other during what is known as the "milling"-process, which gives the strength of the color a severe test, and also to withstand exposure to the weather and sun.

It is doubtless understood, that in colored fabrics, especially where light and dark shades are blended in the same piece, the light shades or threads often present a dark or dirty appearance. This results from the insufficient permanence of the dark colors, which, being too severely tested for their strength, by the milling-process, run into the lighter ones.

By combining the foreign dyes with the domestic extracts, I produce a coloring possessing less stringent power than the domestic extracts alone, and of more permanence than the foreign dyes. Thus I give to each a portion of the qualities appertaining to the other, the result of such combination being not only a new article of manufacture, superior to anything now in use for the purpose, but also one which can be furnished at a price reduced in proportion to the amount of domestic extracts used.

Taking into consideration the number of foreign dyes, and the number of domestic extracts, it would be impossible for me to set forth, in this specification, all the different combinations that would be required to produce the different colors. I shall, therefore, describe accurately only one, as the principles therein involved, and the invention shown, will be the same in any and all the combinations of which the dyes and extracts are capable.

To color dark brown, I produce my dye by the following combination:

Two hundred and eighty pounds of wool, prepared with five and a half pounds chrome and two and a half pounds argols. I then use twenty-five pounds fustic, twenty-four pounds hemlock, and thirty pounds cam-wood, and sadden with one and a half pound blue vitriol, and two and a half pounds copperas.

If the hemlock were not used in this combination, it would be necessary to supply its place with fifty pounds of cam-wood, at a cost of fifteen cents per pound, while the hemlock can be furnished at twelve. Thus, in addition to the superior permanence and beauty of color which this combination produces, a saving of three cents per pound is made.

My invention is not for the particular combination above set forth, the same being given only for the purpose of showing the practical use of the domestic extracts with the foreign dyes. Neither would it be possible for me to confine myself to any particular combination, as each and every color or shade would require a dye composed of ingredients, in such quantities and having such relative proportions as, according to well-established principles and experiments, are known to be necessary to produce the desired color.

What I claim as my invention, and desire to secure by Letters Patent, is—

A new dye for coloring, produced by the combination of extracts made from domestic barks, woods, or plants, with the foreign dyes, such as fustic, cam-wood, madder, nutgalls, sumach, hypernic, Brazil-wood, weld, bar-wood, logwood, and red saunders, in any and all combinations necessary to produce the various colors

GEO. W. TALBOT.

Witnesses:
W. B. VINCENT,
JOHN D'W. TAYLOR.